(12) United States Patent
Urabe et al.

(10) Patent No.: US 7,003,022 B2
(45) Date of Patent: Feb. 21, 2006

(54) MATCHED FILTER AND RECEIVER FOR MOBILE RADIO COMMUNICATION SYSTEM

(75) Inventors: Kenzo Urabe, Yokohama (JP);
Kazushige Yamamoto, Kanagawa (JP)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 813 days.

(21) Appl. No.: 09/845,216

(22) Filed: May 1, 2001

(65) Prior Publication Data

US 2001/0038667 A1    Nov. 8, 2001

(30) Foreign Application Priority Data

May 1, 2000   (JP)   ............................ 2000-132619

(51) Int. Cl.
*H04B 1/69*   (2006.01)

(52) U.S. Cl. ........................................ 375/152; 150/343
(58) Field of Classification Search ................ 375/140, 375/144, 142, 343, 130, 147, 150, 152, 316
See application file for complete search history.

(56) References Cited

U.S. PATENT DOCUMENTS

| | | | | |
|---|---|---|---|---|
| 5,818,866 A | * | 10/1998 | Wilk | ........................ 375/149 |
| 5,910,948 A | * | 6/1999 | Shou et al. | ................ 370/335 |
| 5,953,366 A | * | 9/1999 | Naruse et al. | ............. 375/148 |
| 5,974,038 A | * | 10/1999 | Shou et al. | ................ 370/335 |
| 5,999,560 A | * | 12/1999 | Ono | .......................... 375/148 |
| 6,052,405 A | * | 4/2000 | Nakano | ..................... 375/150 |
| 6,075,807 A | * | 6/2000 | Warren et al. | ............. 375/143 |
| 6,148,044 A | * | 11/2000 | Ono et al. | .................. 375/343 |

FOREIGN PATENT DOCUMENTS

| | | |
|---|---|---|
| EP | 0 615 347 A1 | 9/1994 |
| EP | 0 690 588 A2 | 1/1996 |
| EP | 0 851 637 A2 | 7/1998 |
| WO | WO 00/21208 A2 | 4/2000 |

* cited by examiner

*Primary Examiner*—Chieh M. Fan
*Assistant Examiner*—Jason M. Perilla
(74) *Attorney, Agent, or Firm*—Potomac Patent Group PLLC

(57) ABSTRACT

A matched filter requiring no high-speed processor and which consumes less power is disclosed. Partial filters 301–30N obtained by dividing number of matched filter taps by N are provided with a controller 341 for controlling which partial filters are enabled. The controller 341 is supplied with maximum amount of delay of an input signal and with symbol timing. On the basis of the maximum amount of delay, the controller 341 enables only the minimum number of partial filters 301–30*n* that are capable of executing an amount of computation that is required in one symbol period. The enabled partial filters are used multiple number of times per symbol period and the output, each time, integrated sample by sample. Since the disabled partial filters will not operate, it is possible to reduce power consumption and computation time.

8 Claims, 11 Drawing Sheets

FIG. 7

$Ts1: \underbrace{(c_1d_1 + c_2d_2 + c_3d_3 + c_4d_4)}_{A} + \underbrace{(c_5d_5 + c_6d_6 + c_7d_7 + c_8d_8)}_{B} + \underbrace{(c_9d_9 + c_{10}d_{10} + c_{11}d_{11} + c_{12}d_{12})}_{C} + \underbrace{(c_{13}d_{13} + c_{14}d_{14} + c_{15}d_{15} + c_{16}d_{16})}_{D}$ $Ts2: \underbrace{(c_1d_2 + c_2d_3 + c_3d_4 + c_4d_5)}_{E} + \underbrace{(c_5d_6 + c_6d_7 + c_7d_8 + c_8d_9)}_{F} + \underbrace{(c_9d_{10} + c_{10}d_{11} + c_{11}d_{12} + c_{12}d_{13})}_{G} + \underbrace{(c_{13}d_{14} + c_{14}d_{15} + c_{15}d_{16} + c_{16}d_{17})}_{H}$ $Ts3: \underbrace{(c_1d_3 + c_2d_4 + c_3d_5 + c_4d_6)}_{I} + \underbrace{(c_5d_7 + c_6d_8 + c_7d_9 + c_8d_{10})}_{J} + \underbrace{(c_9d_{11} + c_{10}d_{12} + c_{11}d_{13} + c_{12}d_{14})}_{K} + \underbrace{(c_{13}d_{15} + c_{14}d_{16} + c_{15}d_{17} + c_{16}d_{18})}_{L}$ $Ts4: \underbrace{(c_1d_4 + c_2d_5 + c_3d_6 + c_4d_7)}_{M} + \underbrace{(c_5d_8 + c_6d_9 + c_7d_{10} + c_8d_{11})}_{N} + \underbrace{(c_9d_{12} + c_{10}d_{13} + c_{11}d_{14} + c_{12}d_{15})}_{O} + \underbrace{(c_{13}d_{16} + c_{14}d_{17} + c_{15}d_{18} + c_{16}d_{19})}_{P}$ $\vdots$ $Ts16: c_1d_{16} + c_2d_{17} + c_3d_{18} + c_4d_{19} + c_5d_{20} + c_6d_{21} + c_7d_{22} + c_8d_{23} + c_9d_{24} + c_{10}d_{25} + c_{11}d_{26} + c_{12}d_{27} + c_{13}d_{28} + c_{14}d_{29} + c_{15}d_{30} + c_{16}d_{31}$

MATCHED FILTER AND RECEIVER FOR MOBILE RADIO COMMUNICATION SYSTEM

FIELD OF THE INVENTION

This invention relates to a matched filter used in a path search in the receiver of a mobile radio communication system that utilizes a spread-spectrum signal. More particularly, the invention relates to a matched filter capable of reducing power consumption and mounting area. The present invention relates further to a receiver which uses a matched filter.

BACKGROUND OF THE INVENTION

Mobile radio communication systems typified by cellular telephone systems have come into wide use rapidly in recent years. This increase in number of subscribers has been accompanied by a shift from analog to digital communication systems and a further transition to next-generation systems is about to take place. One system that is currently the focus of attention, as such a next-generation communication system, is CDMA (Code Division Multiple Access), which is a communication system that relies upon spread-spectrum modulation.

According to the CDMA system, a user-specific spreading code sequence is assigned on a per-user basis. The transmitter transmits a transmission signal (modulated signal) the spectrum of which is spread by multiplying transmission data by the spreading code sequence, and the receiver multiplies the received signal by a code sequence synchronized with symbol timing and identical with the spreading code sequence that was used on the transmit side, thereby demodulating the received signal and recovering the transmitted data.

With this system, instead of assigning a different transmission frequency band or transmission time to each user in the manner of FDMA (Frequency Division Multiple Access) or TDMA (Time Division Multiple Access), a common transmission band and transmission time are assigned to all users so that the signals of respective users are transmitted at the same time in the same frequency band that has been allocated to the system. It is known that the CDMA system makes it possible to increase system capacity (number of subscribers) in comparison with other multiple-access systems such as FDMA and TDMA by skillfully controlling and suppressing interference that occurs among multiple users sharing the same frequency band and transmission time.

In a mobile radio communication system, a so-called multi-path phenomenon occurs. This is a phenomenon in which a signal that has been transmitted from a transmitter arrives at a receiver through a plurality of different paths upon being reflected by buildings and other structures. In such instances the receiver receives a multi-path signal resulting from a combination of multiple signals whose propagation delays differ depending upon the paths traveled.

The CDMA system makes it possible to achieve path diversity by taking advantage of such a multi-path signal. A specific example known in the art is the RAKE receiver. The path diversity effect also contributes to an increase in CDMA system capacity.

FIG. 10 is a block diagram illustrating an example of the configuration of a conventional RAKE receiver. As shown in FIG. 10, a CDMA radio signal is received by an antenna 101 and a receive circuit 102 and then is multiplied with a local carrier in a frequency mixer 103, whereby the signal is converted to a baseband signal. The output of the frequency mixer 103 is sampled at a predetermined rate by a sampling circuit (not shown) and converted by an A/D converter (not shown) and is then supplied to a matched filter 104 as a stream of digital values.

The matched filter 104 executes despreading process using a spreading code supplied by a spreading code generating circuit, which is not shown. The output of the matched filter 104 is supplied to a path-timing detector 105 and RAKE combiner 106. The path-timing detector 105 and matched filter 104 constitute a path searcher which determines the effective paths to be added in the RAKE combiner 106.

The RAKE combiner 106 accepts the receive signal from the matched filter 104 at the timing supplied by the path-timing detector 105, adds the signals of the prescribed number of effective paths (fingers) coherently by aligning the phases of these path signals and then outputs the result. The output signal is evaluated by a symbol detection circuit (not shown) and the demodulated data is obtained. If necessary, the amplitudes of the path signals are weighted at the phase alignment.

The matched filter 104 can be configured by a transversal-type matched filter in which the number of taps is equal to the number of chips of one symbol period, i.e., to the spreading factor, wherein the chip values of a spreading code are supplied as the tap values. In a case where over-sampling is performed by the sampling circuit, the number of taps is the product of the spreading factor and the number of over-samplings. Each tap is supplied with a code sequence in which each chip of the spreading code is repeated in accordance with the number of over-samplings, or with a code sequence in which numerical values of 0 have been interpolated among each chip value of the spreading code in accordance with the number of over-samplings.

FIG. 11 is a diagram illustrating an example of a configuration of the matched filter 104, which has M-number of taps (where M is a natural number). This example illustrates a matched filter of the well-known transversal type.

As shown in FIG. 11, the matched filter comprises M-number of delay elements (D) 201, 202, ..., 20(M−1), 20M; M-number of multipliers 211, 212, 213, ..., 21(M−1), 21M; and (M−1)-number of adders 221, 222, 223, ..., 22(M−1)

The multipliers are supplied with respective ones of tap values C1, C2, C3, ..., C(M−1), CM, multiply the outputs of the respective delay elements by the respective tap values and outputs the products. The outputs of the multipliers are added by the adders and the total of the outputs of all multipliers is obtained from the adder 221 as the final output of the matched filter.

The delay elements 201–20M each represent a delay of one sampling interval. In a case where spreading factor T of transmitted signal and sampling rate of the input signal to the transversal-type filter are equal, the number of taps M is equal to T. If the input signal undergoes 2 times over-sampling, M=2T holds.

The tap values C1–CM are supplied with the chip values of the spreading code. More specifically, if the spreading codes are "+1, +1, −1, +1, −1, +1, +1, ...", then the tap values "+1, +1, −1, +1, −1, +1, +1, ..., " are supplied in order starting from C1. If the input signal undergoes 2 times over-sampling, then tap values "+1, +1, +1, +1, −1, −1, +1, +1, −1, −1, +1, +1, +1, +1, ..." or tap values "+1, 0, +1, 0, −1, 0, +1, 0, −1, 0, +1, 0, +1, 0, ..." are supplied in order starting from C1.

Thus, the matched filter multiplies input data of M samples and a spreading code of M chips, together chip by chip, and obtains the total of the products as the output, and this output indicates the degree of correlation between the input signal and the spreading code. Accordingly, if a multi-path signal is supplied as the input signal to the matched filter, the sum of products is calculated chip by chip while staggering timing, successively, over one period of the spread code and the output result is monitored, then the reception timing of a signal having strong correlation, i.e., the reception timing of each path signal contained in the multi-path signal, can be determined.

For example, in the receiver shown in FIG. 10, the path-timing detector 105 compares the output result of the matched filter 104 with a predetermined threshold value and, when the threshold value is exceeded, the path-timing detector 105 notifies the RAKE combiner 106, thereby giving notification of the timing of the path signals that are to be combined.

In a case where the path-timing detector 105 and RAKE combiner 106 have a receive buffer corresponding to one period of the spreading code, the path-timing detector 105 can retain the output result from the matched filter 104 over one period of the spreading code, thereby making it possible to detect a prescribed number of timings at which large results are obtained and report these timings to the RAKE combiner 106.

This processing of the matched filter can be implemented using a general-purpose microprocessor or a digital signal processor (DSP).

As mentioned above, the matched filter requires a number of taps equal to the spreading factor or to the product of the spreading factor and the number of over-samplings. Therefore, if the spreading factor is 512, at least 512 taps will be required.

Since a 512-tap matched filter requires 512 delay elements, 512 multipliers and 511 two-input adders, the scale of the circuitry is extremely large. In reality, because over-sampling is usually carried out in order to achieve reception with good precision, the number of taps becomes actually many times larger, as a consequence the problem of scale is compounded.

In addition, since all of these very large numbers of operational elements operate simultaneously in synchronized with the sampling clock, power consumption increases in dependence upon the number of the taps.

Further, in a case where the function of the matched filter is implemented by a processor, a high-speed processor is required because it is necessary to execute the product-summing processing within one sampling clock interval a number of times equivalent to the number of taps per symbol period. For example, if this arithmetic processing is executed using a processor that controls the overall receiver, the load on the processor will become so large that other processing may be affected. If a separate dedicated processor is used, this will enlarge the mounting area of the receiver and an increase in power consumption will be unavoidable.

If the matched filter that is necessary for a receiver requires a large mounting area and/or power consumption, this will be a further impediment to achieving a size/power-consumption reduction in a mobile radio communication terminal. This may also lead to less call standby-time and talk-time.

SUMMARY OF THE INVENTION

Accordingly, an object of the present invention is to provide a matched filter that does not require a high-speed processor and that consumes less power.

The gist of the present invention is a matched filter having a plurality of multiplication means for multiplying an input-sample stream and a predetermined code sequence together in predetermined unit by predetermined unit; wherein the results of multiplication by the plurality of multiplication means are summed and output, characterized in that the input-sample stream is a stream obtained by sampling a multi-path signal; and in that the matched filter has control means for determining which multiplication means actually perform multiplication among the plurality of multiplication means; a minimum number of multiplication means necessary for a period of time during which there arrive path signals regarded as being effective among a plurality of path signals contained in the multi-path signal.

The gist of present invention in another aspect thereof is a matched filter for obtaining and outputting correlation between an input-sample stream and a code sequence having predetermined periodicity, characterized in that the input-sample stream is a stream obtained by sampling a multi-path signal, and in that the matched filter has multiplication means of a number equivalent to a number of codes constituting at least one period of the code sequence; addition means for summing outputs of the multiplication means and outputting the sum as a value representing correlation of the input-sample stream to the code sequence; and control means for determining which multiplication means actually perform multiplication among the multiplication means, a minimum number of multiplication means necessary for a period of time during which there arrive path signals regarded as being effective in the multi-path signal, and controlling said determined multiplication means to multiply said code sequence of one symbol length and each value of said input-sample stream.

The gist of present invention in another aspect thereof is a matched filter characterized by having: a plurality of delay elements connected in series and having an externally supplied input-sample stream input to one end thereof; a plurality of multiplication means to which outputs from the plurality of delay elements are applied as a first input signal and externally supplied data is applied as a second input signal for multiplying the first and the second input signals together; addition means for summing outputs of the plurality of multiplication means and outputting the sum as a value representing correlation of the first input signal to the second input signal; and control means for dividing the plurality of delay elements and multiplication means into blocks, performing enable/disable control block by block, and supplying each of the plurality of multiplication means contained in a block that has been enabled with a code constituting a partial code sequence of a predetermined code sequence; and in that the input-sample stream is a stream obtained by sampling a multi-path signal, and from among the blocks of the multiplication means, the minimum number of blocks of multiplication means necessary for a period of time during which there arrive path signals regarded as being effective in the multi-path signal are enabled by enable/disable control as a block which actually performs multiplication.

The gist of present invention in another aspect thereof is a receiver for a mobile radio communication system that uses a matched filter according to the present invention.

The gist of present invention in another aspect thereof is an arithmetic unit characterized by functioning as a matched filter according to the present invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram useful in describing the content of operations performed in a matched filter of conventional configuration, wherein one sequence of spreading code is composed of 16 bits and the number of taps is 16;

FIGS. 8A and 8B are diagrams useful in describing the content of operations performed by a partial filter 301 of the matched filter according to the embodiment of the present invention under conditions equivalent to those of FIG. 7;

DETAILED DESCRIPTION OF THE PREFERRED EMBODIMENTS (Configuration of Receiver)

A preferred embodiment of the present invention will now be described in detail with reference to the drawings.

Figure 1:
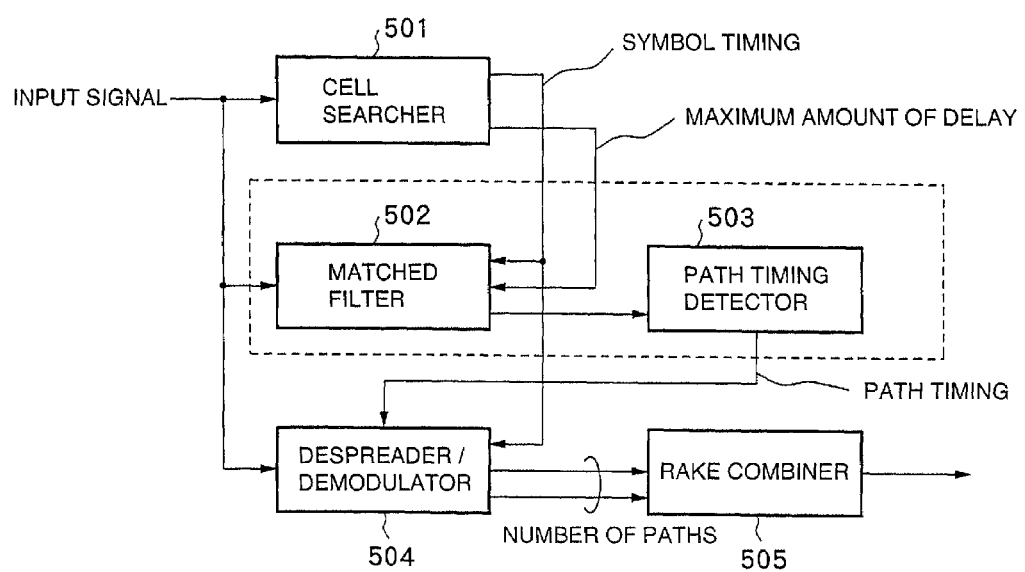
FIG. 1 is a block diagram showing an example of the principle components of a CDMA receiver to which a matched filter according to the present invention can be applied.

FIG. 1 is a block diagram showing an example of the principle components of a receiver of a CDMA communication system to which a matched filter according to the present invention can be applied. The implementation shown in FIG. 1 shows components related to signal processing up to a point prior to symbol detection following conversion to a baseband signal via a frequency mixer and then conversion to a stream of digital values while sampling is performed at a predetermined rate. The stream of digital values is represented simply as an input signal.

A cell searcher 501 in FIG. 1 decides the cell to which the communication terminal having this receiver should synchronize. In CDMA systems, a received signal having the strongest reception strength (or best quality) is used for synchronization among multiple signals received from a plurality of base stations at the same time. In order to accomplish this, which base station to synchronize to (and which spreading code sequence to use) is decided by the cell searcher 501.

The cell searcher 501 further performs synchronization acquisition and synchronization tracking and supplies a matched filter 502 and a despreader/demodulator 504(sometimes simply referred to as "demodulator" hereinafter) with symbol timing and a multi-path delay Td in one symbol period.

The matched filter 502 receives the symbol timing from the cell searcher 501 and, using the input signal and spreading code, sends an output indicative of degree of correlation to a path timing detector 503. The latter detects effective-path timings of a prescribed number from the output of the matched filter 502 and outputs the path timings to the demodulator 504. The demodulator 504, which has demodulation circuits of the effective-path number (the number of path signals to be combined) predetermined in a manner described later, despreads the effective-path signals based upon the symbol timing received from the cell searcher 501 and the path timings received from the path timing detector 503.

A RAKE combiner 505 weights the effective paths output by the demodulator 504, combines these path signals by aligning phases and outputs the result to a symbol detection circuit, which is not shown. The operation for aligning the phases can be implemented by using, as a reference, the phase of each path in the pilot signal contained in the received signal.

Figure 2:
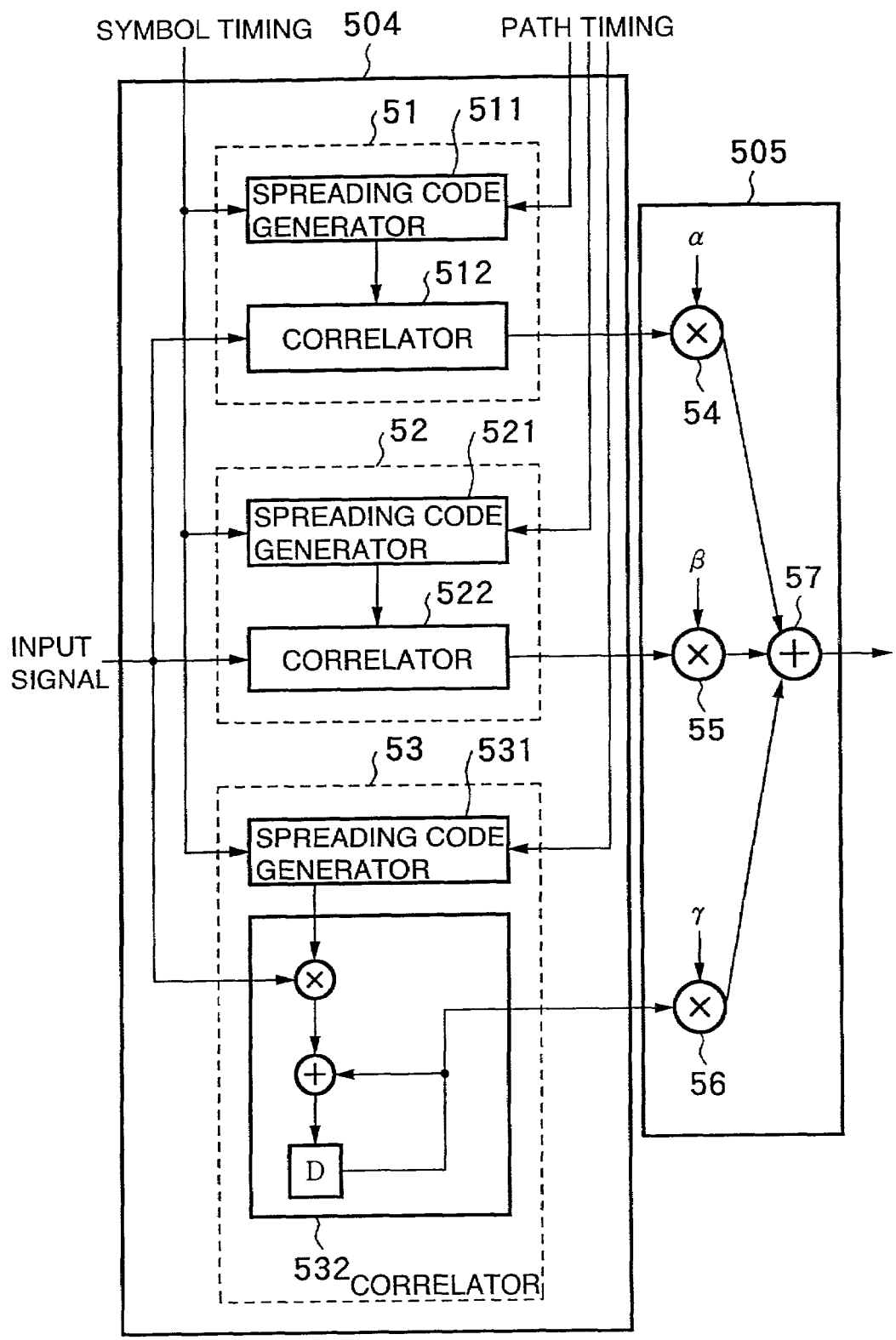
FIG. 2 is a block diagram illustrating an example of a configuration of a demodulator 504 and RAKE combiner 505 in the matched filter in FIG. 1.

FIG. 2 is a block diagram illustrating an example of a configuration of the despreader/demodulator 504 and RAKE combiner 505 shown in FIG. 1. FIG. 2 illustrates implementation for a case where the number of effective paths is three. Numerals 54, 55 and 56 denote multipliers for phase alignment and weighting.

The demodulator 504 has demodulation circuits 51, 52 and 53, the number of demodulators being equal to the number of effective paths. The demodulation circuits 51, 52, 53 have respective spreading code generators 511, 521, 531 which, on the basis of the effective-path timing information detected by the path-timing detector 105 and the symbol timing from the cell searcher 501, generate spreading code sequences at timings that differ from one another and supply these code sequences to corresponding correlators 512, 522, 532, respectively, whereby processing of despreading the effective-path signals is executed. It should be noted that the path timing information is supplied separately to the individual spreading code generators.

The outputs of the correlators 512, 522 and 532 are supplied to an input terminal of respective multipliers 54, 55 and 56 of the RAKE combiner 505. Supplied to the other input terminals of the multipliers 54, 55 and 56 are coefficients $\alpha$, $\beta$ and $\gamma$, respectively, for performing weighting and for aligning phases by canceling out phase fluctuation of the paths measured in advance.

These coefficients are prepared by periodically receiving a specific signal, such as a pilot signal on a control channel, the content of which is known in advance, and detecting phase-fluctuation of each effective paths by using a phase-fluctuation detection circuit (not shown).

The effective-path signals whose phases have been aligned and which have been weighted by the multipliers 54, 55 and 56 in the RAKE combiner 505 are combined by an adder 57, with the resulting signal being output to a symbol detection circuit (not shown).

Figure 3:
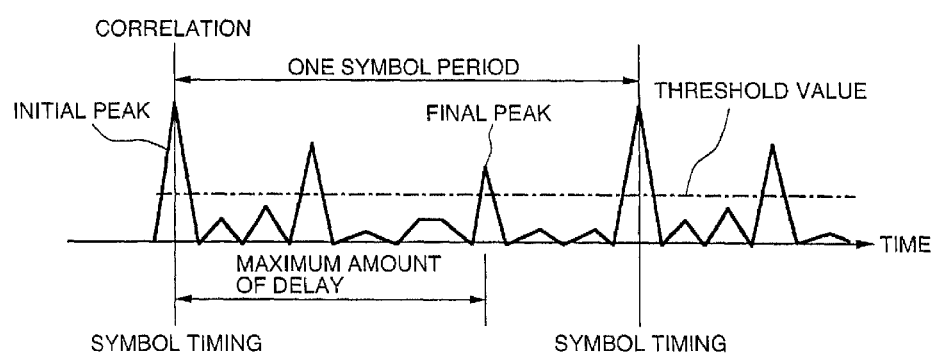
FIG. 3 is a diagram useful in describing a method of deciding maximum amount of delay.

Next, reference will be had to FIG. 3 to describe symbol timing and method of deciding multi-path delay in the cell searcher 501.

The cell searcher 501 has a well-known symbol timing detection circuit (not shown) using a serial search acquisition circuit or matched filter. In any case, by despreading the input signal using the spreading code generated within the cell searcher, the correlation between the spreading code and the input signal is determined over one period of the spreading code sequence and symbol timing is decided using the timing for which the strongest correlation is obtained.

FIG. 3 represents schematically the correlation, which is obtained in the cell searcher 501, between a spreading code sequence and the input signal. In the example of FIG. 3, the largest correlation peak is determined as the start time of the symbol period, and the time difference between the start time and the time at which the final peak exceeds a predetermined threshold value (as shown in FIG. 3) is decided upon as the maximum amount of delay of the multi-path signal.

In this embodiment, the cell searcher 501 decides that an effective-path signal is a signal having a peak that exceeds the predetermined threshold value. The threshold value is determined in advance based upon reliability information such as the signal-to-noise ratio and signal-to-interference ratio of the multi-path signal.

(Principle)

The operating principle of the matched filter according to the present invention will now be described. In a conventional matched filter, within one symbol period, the product-summing calculation is performed a number of times equivalent to the square of the number of chips (number of taps) that form at least one symbol period (one sequence) of a spreading code sequence, and a path search is conducted for paths having a delay corresponding to up to one symbol period. Accordingly, if the spreading code has a period of 16 bits and there is no over-sampling, the product-summing calculation should be performed 16×16=256 times in a 16 sampling periods.

In an ordinary mobile radio communication system, however, if the communication distance between a transmitting station and a receiving station is comparatively short, the maximum amount of delay of the multi-path signal is short in comparison with one symbol period and there are instances where effective paths do not diverge over the entire symbol period. Further, in a case where the particular purpose is a path search, if the timing of the final arriving effective path can be detected, it will not be necessary to perform an operation to search for paths that have no possibility of arriving after being delayed beyond this timing.

Reducing the amount of computation increases available processing time for individual operations such as product-summing during one symbol period and therefore decreases the requirement of high-speed processing. In addition, with the computation reduction, a calculation that has to be performed within a sampling period provided by one delay element can be executed using a plurality of sampling periods. This makes it possible to reduce, further, the number of taps actually used. For example, if the spreading factor is 16, the over-sampling rate is one and the maximum amount of delay is eight sampling periods, then a search for paths having amounts of delay of 9–16 sampling periods (in the above example) becomes unnecessary. The amount of calculation, therefore, is halved. As a result, computation that needs to be performed 16 times in one sampling period now need be performed only eight times. As a consequence, the processing speed of the matched filter that performs the operation can be halved or the number of taps used in the path search can be halved from 16 to 8.

Further, employing a matched filter in which the number of taps used can be adjusted and the adjustment of the number of taps used in dependence upon the maximum delay that is detected periodically makes it possible to deal with a maximum delay that fluctuates.

(Configuration of Matched Filter)

Figure 4:
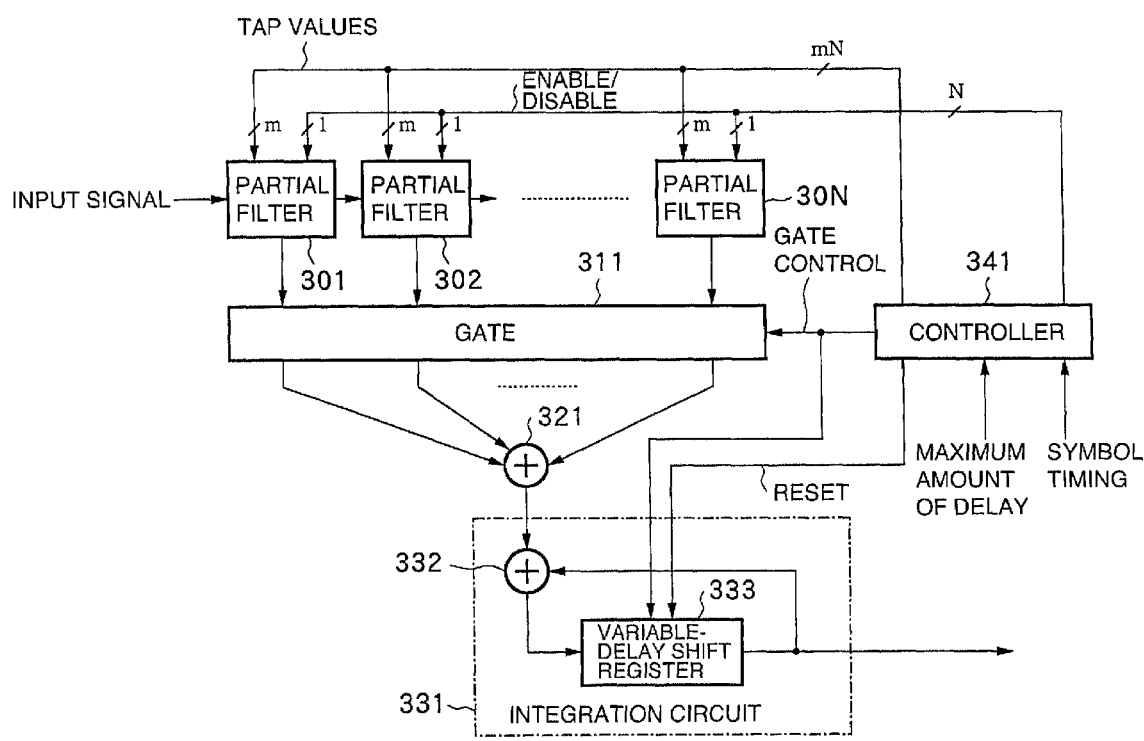
FIG. 4 is a circuit diagram showing an example of the configuration of a matched filter according to an embodiment of the present invention.

FIG. 4 is a block diagram showing the configuration of a matched filter according to an embodiment of the present invention. The matched filter in FIG. 4 has a plurality (N, which is a natural number equal to 2 or greater) of partial filters 301, 302, . . . , 30N; a gate 311, for delivering a selected outputs of the partial filters 301–30N designated by a control signal from a controller 341; an adder 321 for adding all outputs from the gate 311; an integration circuit 331 for integrating the output of the adder 321; and the controller 341, which controls the overall matched filter.

Each partial filter is a matched filter having a predetermined number (m, which is a natural number equal to 2 or greater) of taps. Serially connecting N-number of the partial filters 301–30N construct a matched filter having m×N taps overall. Partial filters 301–30N are supplied by the controller 341 with values (spreading code) applied to each of the taps and with an enable/disable control signal for starting/stopping operation on a per-partial-filter basis.

The integration circuit 331, which is constituted by, e.g., an adder 332 and an n×m (where n is the number of active partial filters)-stage variable-delay shift register 333, described later, retains (m×n)-number of results of addition obtained by summing the output of the adder 321 every m×n outputs.

Figure 5:
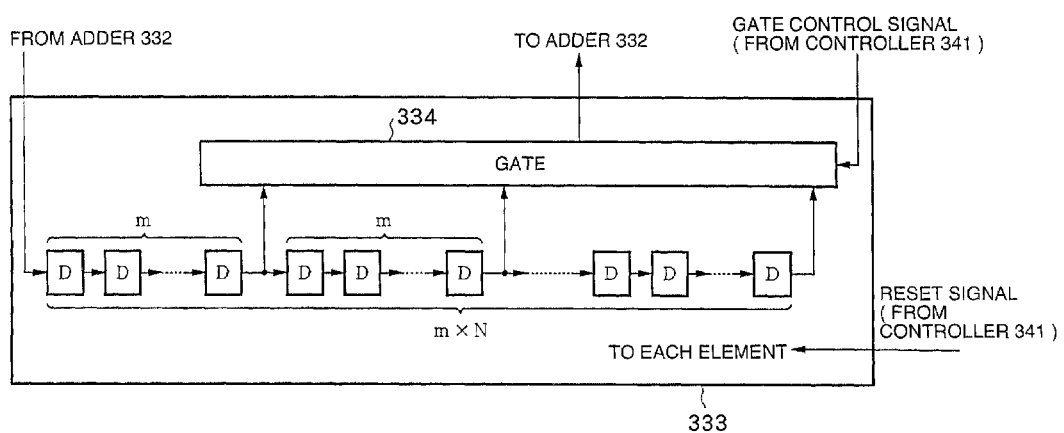
FIG. 5 is a block diagram showing an example of a configuration of a variable-delay shift register in an integrating circuit.
Figure 6:
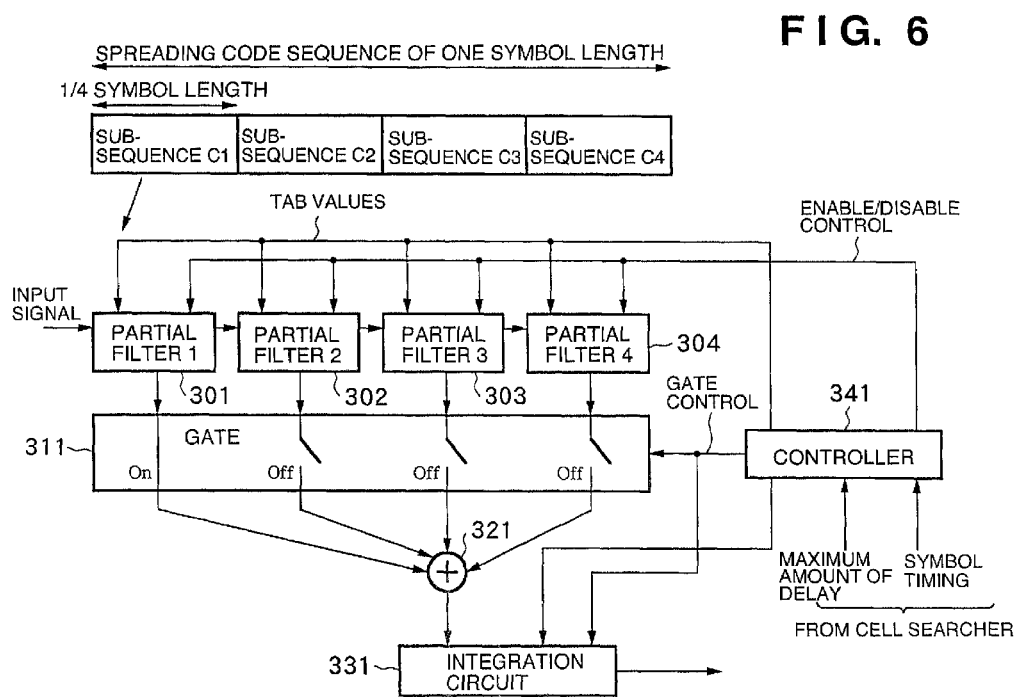
FIG. 6 is a circuit diagram showing a configuration of the matched filter of FIG. 4 in a case where N=4, n=1 hold.

An example of the configuration of the variable-delay shift register 333 is illustrated in FIG. 5. Specifically, the shift register is constituted by m×N serially connected delay elements (D) and a gate 334. From signals (the maximum number of which is N) input to it every m-number of serially connected delay elements, the gate 334 selects one and outputs it to the adder 332 based upon a gate control signal supplied from the controller 341. This arrangement makes it possible to vary the amount of signal delay by the control signal. The content of the variable-delay shift register 333 is reset (to zero) by a reset signal from the controller 341.

The controller 341 is supplied by the cell searcher 501 with the symbol timing and maximum delay time, as described earlier.

(Operation)

Let Ts represent the sampling period of the input signal and let n (where n is a natural number and $N \geq n \geq 1$ holds) represent the number of partial filters that have been enabled by the enable/disable control signal of controller 341. Since the n-number of partial filters construct a matched filter having n×m taps, it is possible to process an input signal having a period of time equal to n×m×Ts.

Accordingly, if we let Td represent the maximum delay time of the multi-path signal, n is determined from the following expression:

$$n \times m \times Ts \geq Td > (n-1) \times m \times Ts \tag{1}$$

In general, Td is smaller than n×m×Ts. In a case where use is made of n-number of partial filters, therefore, (N−n)-number of partial filters corresponding to the remaining (N−n)×m taps are disabled and have their operation inhibited by the enable/disable control signal. This makes it possible to reduce power consumption by a wide margin.

Let C1, C2, . . . CN represent N subsequences of the spreading code obtained by dividing the (one sequence f) spreading code into N subsets, then each subsequence can be' denoted as follows.

C1=(c1,1, c1,2, . . . c1,m)
C2=(c2,1, c2,2, . . . c2,m)

.
.

CN=(cN,1, cN,2, . . . cN,m)

In the description rendered below, the j-th value in an i-th subsequence is represented by ci,j ($N \geq i \geq 1$, $m \geq j \geq 1$).

The controller 341 first finds the n that satisfies the above-cited Expression (1) from the maximum delay time Td supplied by the cell searcher 501, the already known sampling period Ts and the number m of taps of each partial filter. The controller then enables the n-number of partial filters 301–30n, disables (inhibits the operation of) the other partial filters 30(n+1)–30N and outputs a control signal to the gate 311 so that only the outputs of the partial filters 301–30n are delivered to the adder 321.

Next, at the taps (multipliers) of the enabled partial filters 301–30n, the controller 341 sets the corresponding subsequences C1 (c1,1–c1,m)–Cn (cn,1–cn,m) of the spreading code.

Figure 11:
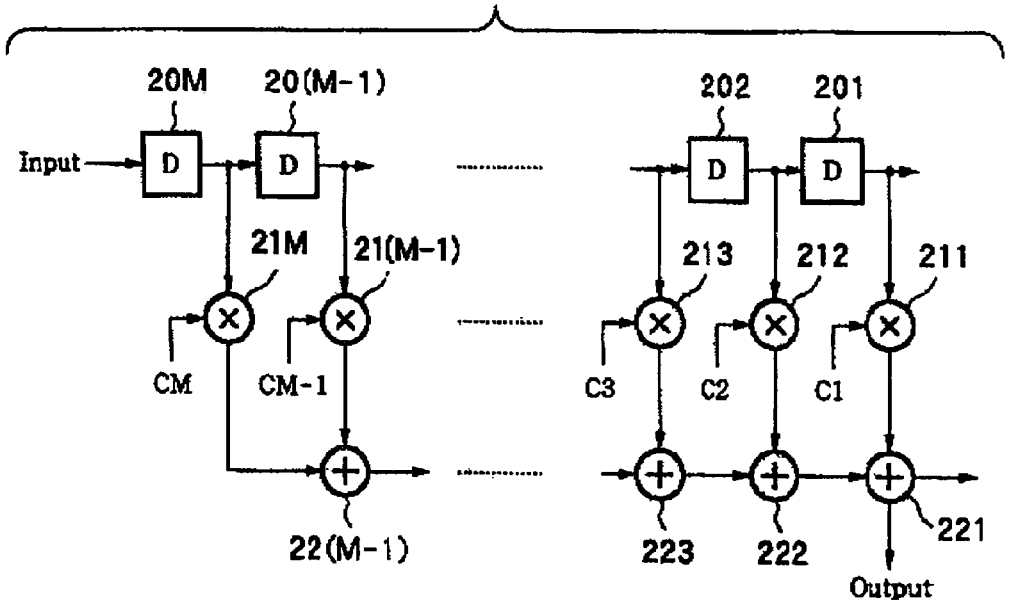
FIG. 11 is a circuit diagram showing an example of the configuration of a transversal filter used as a matched filter according to the prior art.

As described with reference to FIG. 11, the partial filters 301–30n multiply the input signal by the spreading code supplied to each tap and output the sums of the products. The outputs of the partial filters 301–30n are supplied to the adder 321 through the gate 311, and the adder 321 outputs, to the integration circuit 331 every sampling period Ts, the sum total of the operational results from the partial filters 301–30n.

In the integration circuit 331 the adder 332 adds the output of the variable-delay shift register 333 and the operational result from the adder 321 and stores the sum in the variable-delay shift register 333.

Upon elapse of time n×m×Ts, the controller 341 sets the subsequences C (n+1)–C (2n) at the taps of the partial filters 301–30n. New subsequences are subsequently set successively every n×m×Ts and then the above-described process is repeated. After that, if the symbol timing is entered from the cell searcher 501, the initial subsequences C1–Cn will be set again. In response to input of the symbol timing, all values that have been stored in the variable-delay shift register 333 are output to the path-timing detector 105 and the content of the register is reset to prepare for despreading of the next symbol.

As described with reference to FIG. 3, the path-timing detector 503 compares the output of the variable-delay shift register 333 with a threshold value and determines the timings of effective paths. If the stored content of the variable-delay shift register 333 can be read out at all times, the path-timing detector 503 compares the content of the variable-delay shift register 333 and the threshold value in parallel with the operation performed by the matched filter, whereby detection of effective paths will also be completed when the variable-delay shift register 333 is reset.

The operation of the matched filter according to this embodiment will now be described in greater detail with reference to FIGS. 6 to 9. The following will be taken as an example in the description rendered below:

m=4 as number of taps of each of partial filters 301–304;
16 bits for one sequence of spreading code;
N=4 as number by which the sequence is divided;
4 Ts as maximum amount of delay; and
over-sampling rate is one (and hence one symbol period=16 Ts).

The controller 341 first finds the n that satisfies Expression (1) from the maximum delay time Td supplied by the cell searcher 501 and the number m of taps of each partial filter. As a result, n=1 is found. Since only the partial filter 301 is effective in this case, the controller 341 turns on only a switch corresponding to the effective partial filter 301 among switches in gate 311 that correspond to the partial filters 301–304. The controller turns off the other switches. Further, the controller enables the partial filter 301 and disables (halts operation of) the other partial filters 302–304 (see FIG. 6).

In this case, the matched filter according to this embodiment is capable of reducing the amount of calculation per symbol period to $4/16=1/4$ in comparison with the matched filter of the conventional implementation. That is, with the matched filter of the conventional implementation, computation is performed over the entire symbol period using all 16 taps simultaneously. Consequently, if we let C (c1, c2, . . . , c16) represent one sequence of spreading code and let d1, d2, . . . , d16, d17, . . . represent the sample data of the input signal, then, as shown in FIG. 7, the product-summing operation is performed 16 times in each symbol period of 16 Ts, and 256 product-summing operations are required in total.

However, the fact that the maximum amount of delay is 4 Ts means that it will suffice if the search for paths having the delays 1 Ts–4 Ts is conducted within one symbol period. The operations involving Ts5–Ts16 in FIG. 7 (the operations for searching for paths having delays 5 Ts–16 Ts) are performed needlessly (assuming that these operations are for the purpose of path search).

In the matched filter of the conventional implementation, the product-summing operation (Ts1–Ts4 in FIG. 7) performed in the search for paths having amounts of delay up to 4 Ts is carried out 16×4=64 times. It will suffice if this operation is performed in 16 sampling periods (16 Ts) corresponding to one symbol period. Accordingly, the same result can be obtained by performing the operation four times in one sampling period, i.e., by using only the four-tap partial filter 301.

In order to perform the operations indicated by Ts1–Ts4 in FIG. 7 using the single partial filter 301, the subsequence of the spreading code supplied to the taps of the partial filter 301 is updated by the controller 341 every 4 Ts.

FIGS. 8A and 8B illustrate the content of operations performed by the partial filter 301 over the period of time from the 1st sampling period Ts1 to the 16th sampling period Ts16.

Since the subsequences C1–C4 are obtained by dividing one sequence C(c1, c2, . . . , c16) by four, they satisfy the relations shown in FIG. 8A. In order to clarify the relationship with FIG. 7 showing the operation performed by the conventional implementation, the notation c1–c16 will be used with regard to the sequences shown in FIG. 8B illustrating the operations performed by the partial filter 301.

First, since the subsequence C1 (c1, c2, c3, c4) is supplied to the taps in the sampling periods Ts1–Ts4, operations indicated in FIG. 7 by A, E, I, M, respectively, are performed.

When the operation in sampling period Ts4 ends, the controller 341 updates the subsequence supplied to the partial filter 301 from C1 (c1, c2, c3, c4) to C2 (c5, c6, c7, c8). The partial filter 301 performs the operations in the sampling periods Ts5–Ts8 using the subsequence C2. These operations correspond to operations B, F, J, and N in FIG. 7.

Similarly, operations are performed using the subsequence C3 (c9, c10, c11, c12) in the sampling periods Ts9–Ts12 and the subsequence C4 (c13, c14, c15, c16) in the sampling periods Ts13–Ts16, whereby the operations C, G, K, O, D, H, L and P shown in FIG. 7 are carried out.

In order to obtain the results of the operations that were performed heretofore in the sampling periods Ts1–Ts4 from the operational results provided by the partial filter 301, operational results acquired every 4 Ts should be integrated four times. Accordingly, the above-mentioned integration is realized by setting the output tap of the variable-delay shift register 333 to the (n×m)-th stage, i.e., to the fourth stage.

Figure 9:
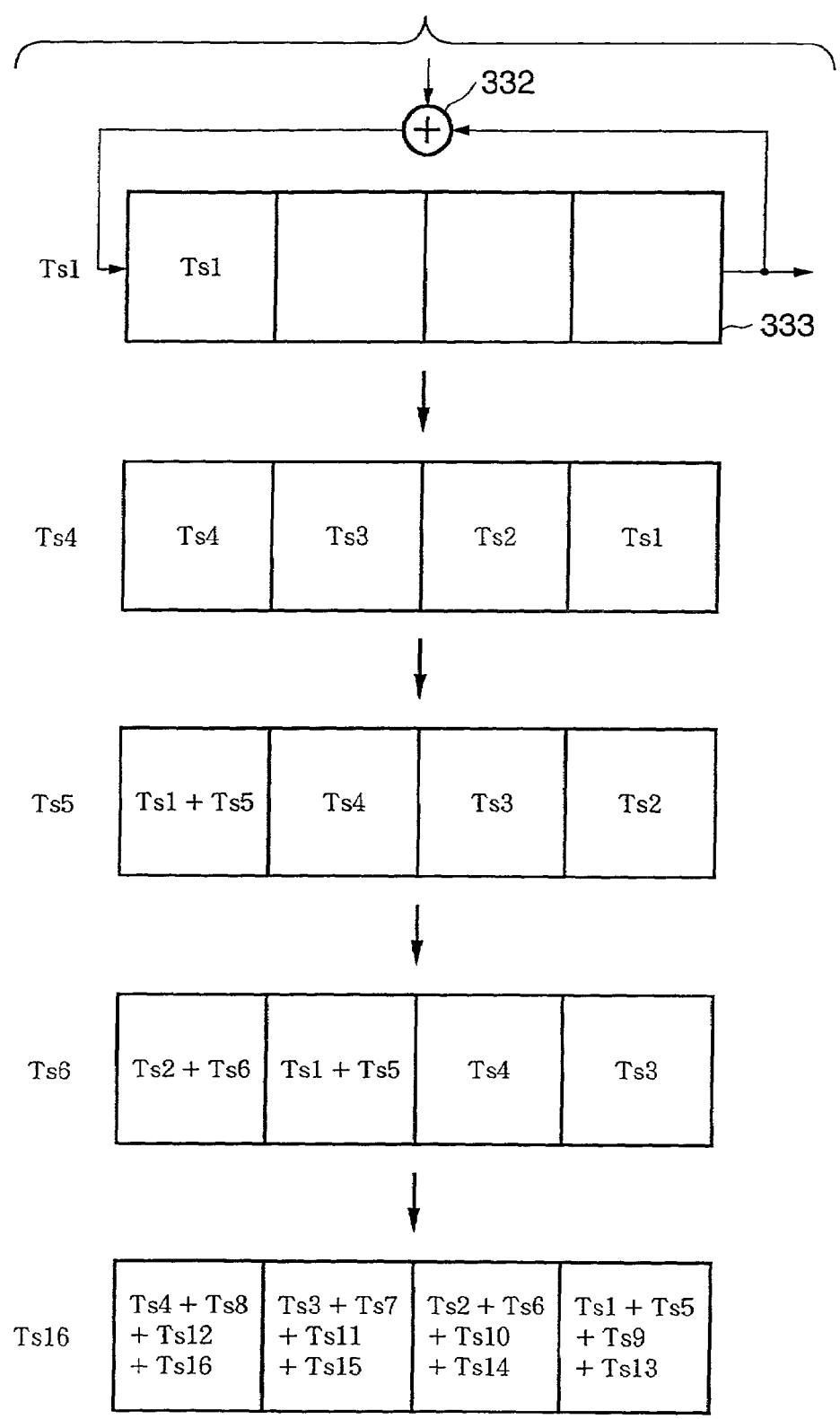
FIG. 9 is a diagram useful in describing operation of a shift register in an integrating circuit.
Figure 10:
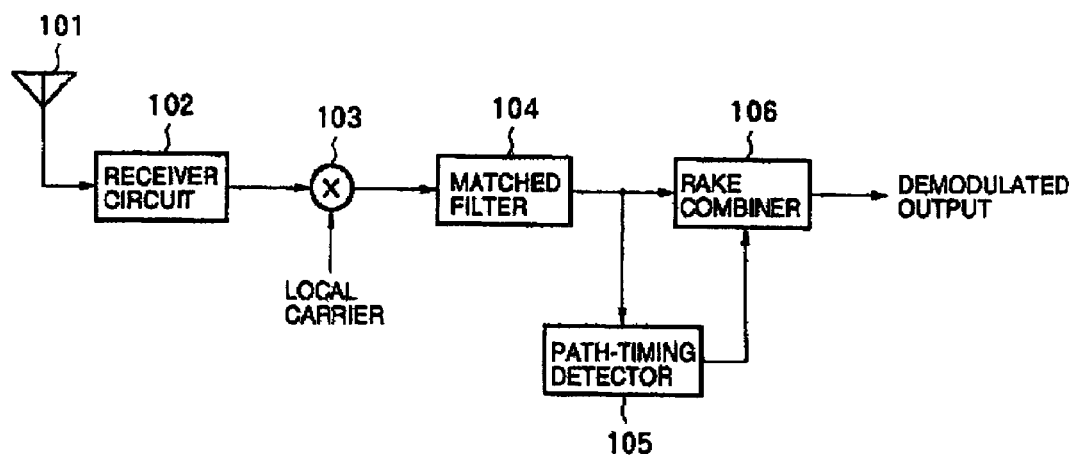
FIG. 10 is a block diagram showing an example of the overall configuration of a RAKE receiver according to the prior art.

FIG. 9 illustrates the change in the content of the variable-delay shift register 333 in the sampling periods Ts1–Ts16. In FIG. 9, Ts1–Ts16 indicated at the stages of the variable-delay shift register 333 signify the results (see FIG. 8B) obtained in the sampling periods Ts1–Ts16, respectively. As should be evident from FIG. 9, the result of performing addition every 4 Ts accumulates in each stage of the variable-delay shift register 333 in the 16th sampling period Ts16. These results are the operational results that were obtained heretofore in the sampling periods Ts1–Ts4 (see FIG. 7), and it will be understood that a path-search result similar to that of the prior art can be obtained by having the path-timing detector 105 use the content of the variable-delay shift register 333.

(Other Embodiments)

In the foregoing embodiment, a case with the maximum amount of delay Td equals to m times Ts where m is the number of taps of the partial filter is described. However, it goes without saying that a matched filter can be constructed in similar fashion even if Td is not a multiple of Ts. In such case needless computation over a period of time less than m×Ts will be performed a number of times. Even so, however, the power-consumption reducing effect of the present invention can be obtained satisfactorily.

Further, the greater the number N of divisions, the finer the number of taps can be controlled. However, this increases the number of switches in the gate and the number of signal lines for control signals. Moreover, enable/disable control owing to a fluctuation in the maximum delay and processing for generating spreading-code subsequences supplied to the taps tend to occur more frequently, which will lead to the increase of control complexity. For this reason, the number of divisions should be determined suitably in conformity with the amount of load on the controller.

Further, in a case where a receiver is constructed using the matched filter according to the present invention, the maximum amount of delay detected by cell searcher is supplied to the matched filter with arbitrary time interval defined by relevant number of symbol periods.

In the embodiment set forth above, delays involved in processing such as detection of maximum amount of delay by the cell searcher, path search by the path-timing detector 105 using the detected maximum amount of delay, and demodulation and phase alignment based upon the results of the path search, as well as delays in processing within the matched filter, have been ignored in the description in order to facilitate an understanding of the embodiment. However, it goes without saying that the signals used in these processing operations can be adjusted, in time, by using buffers or the like.

In addition, in the embodiment set forth above, only a case in which the matched filter is implemented using dedicated hardware is described. However, it goes without saying that the present invention is applicable even in a case where equivalent processing is implemented by software using a general-purpose processor such as an MPU or DSP. In such case the performance required of the MPU or DSP will not be as high because of the reduction in amount of computation. This means that the MPU or DSP may be time-shared by other operation in addition to the matched filter operation. Even in a case where a dedicated processor is used, it is possible to reduce the power consumption.

In accordance with the present invention, as described above, only a number of taps required solely for computation that is necessary are used in a matched filter employed in a path search for detecting effective paths from a multi-path received signal. In addition, a spreading code sequence is divided and supplied to the taps. This makes it possible to realize a matched filter in which power consumption is suppressed by a wide margin in a form adapted to maximum delay time of the multi-path signal.

As many apparently widely different embodiments of the present invention can be made without departing from the spirit and scope thereof, it is to be understood that the invention is not limited to the specific embodiments thereof except as defined in the appended claims.

What is claimed is:

1. A matched filter for obtaining a correlation between a signal received through a multipath transmission line and a spreading code sequence, comprising:
    N partial filters, each partial filter having a predetermined number m of taps, that are serially connected;
    first adder means for adding outputs of activated partial filters from among the N partial filters;
    control means for dividing, based on a time width of effective paths included in the received signal, the spreading code sequence into subsequences, each subsequence having m chips, activating n partial filters from among the N partial filters, wherein n satisfies $n*m*Ts \geq Td > (n-1)*m*Ts$, where Ts represents a sampling period of the received signal and Td represents a maximum delay time of the multipath signal, and supplying the subsequences to the n activated partial filters; end
    second adder means for integrating outputs of the first adder means;
    wherein N, m, and n are integers; $m \geq 2$; and $N \geq 2$; $n \geq 1$.

2. The matched filter of claim 1, wherein the effective paths included in the received signal are determined based upon reliability information of the received signal.

3. The matched filter of claim 1, wherein one of the effective paths is a path which is used to determine symbol timing of the received signal.

4. A receiver for a mobile radio communication system that uses a matched filter according to claim 1.

5. An arithmetic unit that operates as a matched filter according to claim 1.

6. A method for obtaining a correlation between a signal received through a multipath transmission line and a spreading code sequence, comprising:
    adding outputs of activated partial filters from among N partial filters being serially connected, each partial fitter having a predetermined number m of taps;
    dividing, by a control means, the spreading code sequence into subsequences, each subsequence having having m chips, based on a time width of effective paths included in the received signal;
    activating n partial filters from among the N partial fitters, where n satisfies $n*m*Ts \geq Td > (n-1)*m*Ts$, where Ts represents a sampling period of the received signal and Td represents a maximum delay time of the multipath signal;
    supplying respective subsequences to activated partial filters which form respective partial correlations of the subsequences with the received signal; and
    integrating added outputs of enabled partial filters;
    wherein N, m, and n are integers; $\geq 2$; and $N \geq 2$; $n \geq 1$.

7. The method of claim 6, wherein the effective paths included in the received signal are determined based upon reliability information of the received signal.

8. The method of claim 6, wherein one of the effective paths is a path which is used to determine symbol timing of the received signal.

* * * * *